United States Patent [19]

Schimmel

[11] 4,069,210

[45] Jan. 17, 1978

[54] POLYMERIC PRODUCTS

[75] Inventor: Karl F. Schimmel, Verona, Pa.

[73] Assignee: PPG Industries, Inc., Pittsburgh, Pa.

[21] Appl. No.: 728,368

[22] Filed: Sept. 30, 1976

[51] Int. Cl.$^2$ .................. C08G 73/02; C08L 79/02
[52] U.S. Cl. .................. 260/29.2 EP; 204/181;
260/2 EP; 260/2 N; 260/47 EP; 260/59 EP;
260/77.5 AP; 260/77.5 Q; 260/78.41; 260/830
R; 260/830 P
[58] Field of Search .................. 260/29.2 EP, 47 EP,
260/2 EP, 47 EN, 2 N, 77.5 AP, 78.41, 77.5 Q;
204/181

[56] References Cited

U.S. PATENT DOCUMENTS

| | | | |
|---|---|---|---|
| 3,405,104 | 10/1968 | Wakeman et al. | 260/79.3 |
| 3,663,389 | 5/1972 | Koral et al. | 204/181 |
| 3,804,786 | 4/1974 | Sekinakas | 260/18 PT |
| 3,839,252 | 10/1974 | Bosso et al. | 260/29.2 EP |
| 3,947,339 | 3/1976 | Jerabek et al. | 204/181 |
| 3,962,165 | 6/1976 | Bosso et al. | 260/29.2 EP |
| 3,975,346 | 8/1976 | Bosso et al. | 269/29.2 EP |
| 4,009,133 | 2/1977 | Jones | 260/29.2 TN |

Primary Examiner—Harold D. Anderson
Assistant Examiner—Earl A. Nielsen
Attorney, Agent, or Firm—William J. Uhl

[57] ABSTRACT

Polymeric products comprising the acidified reaction product of an organic polyepoxide and a polyamine containing at least two tertiary amine groups are disclosed. The polyamine and the organic polyepoxide are reacted with one another under conditions to form an internally ionized, quaternary ammonium salt group-containing polymer which has a high molecular weight, but relatively low equivalent weight. The polyamine is formed by reacting an organic polyisocyanate or organic polycarboxylic acid with an active hydrogen-containing tertiary amine. The reaction product is acidified to form the quaternary ammonium salt groups. Preparing the polyamine in this manner gives one wide latitude in determining the final structure of the polyamine. In effect, one can "tailor make" the polyamine by appropriate selection of reactants and exert a great measure of control over the properties of the final polymeric product. The preferred polymeric products are non-gelled, water-dispersible and electrodepositable on the cathode.

6 Claims, No Drawings

POLYMERIC PRODUCTS

BACKGROUND OF THE INVENTION

1. Field of the Invention

The present invention relates to polymeric products and, more particularly, relates to polymeric products which electrodeposit on the cathode.

2. Brief Description of the Prior Art

Electrodeposition of aqueous organic coatings has risen to industrial prominence in recent years. The process has many advantages, including uniformity and completeness of coating, even on intricate shapes. Virtually any electroconductive substrate may be coated, although the process has been primarily employed to prime or one-coat ferrous metal substrates.

Particular interest has recently arisen in electrodepositable coatings which deposit on the cathode. Cathodically deposited coatings appear to have better corrosion resistance than anodically deposited coatings. In addition, during anionic electrodeposition, oxygen and metal ions are evolved at the anode which may discolor the depositing coating. At the cathode, however, only hydrogen is evolved which has no detrimental effect on the depositing coating.

For electrodeposition on the cathode, most coating systems are based on polymers containing cationic salt groups. One particularly interesting class of polymer are those containing quaternary ammonium salt groups derived from reacting polyepoxides, such as a polyglycidyl ether of a polyphenol with tertiary amine salts. An example of these types of resins is disclosed in U.S. Pat. No. 3,839,252 to Bosso and Wismer. These resins, for the most part, are prepared with mono-tertiary amine salts and diepoxides and have the charge groups located in the terminal portions of the polymer molecule. Although these particular polymers are eminently suited for use in cationic electrodeposition, currently being employed commercially in many industrial electrodeposition coating applications, they are limited in the charge content attainable. Higher molecular weight species also have higher equivalent weights and this limits the dispersibility of the polymer.

The present invention can be looked upon as an improvement on the resins disclosed in U.S. Pat. No. 3,839,252. In the present invention, the resins are internally ionized with the charge groups being positioned along the polymer chain not only in terminal positions but also in the middle portions of the polymer chain. Thus, high molecular weight products with relatively low equivalent weights can be prepared. The products of the invention are very dispersible, making them particularly attractive candidates for electrodeposition.

SUMMARY OF THE INVENTION

In accordance with the present invention, a polymeric reaction product and preferably a quaternary ammonium salt group-containing polymer is disclosed. The polymer comprises the reaction product of:

A. an organic polyepoxide,

B. a polyamine containing at least two tertiary amine groups, formed from reacting:

1. a member selected from the class consisting of an organic polyisocyanate, an organic polycarboxylic acid, ester or anhydride, and mixtures thereof, 2. an active hydrogen-containing tertiary amine in which the active hydrogens are selected from the class consisting of mercapto, hydroxyl, primary and secondary amine.

To form the quaternary ammonium salt group-containing polymer, the reaction product is acidified to provide salt groups along the polymer backbone.

In a preferred embodiment of the invention, the polymeric products are non-gelled, water-dispersible and electrodepositable on the cathode. In this embodiment, (1) and (2) react with one another to form a polyamine which is stable in water, that is, when the final polymeric product is dispersed in water, the linkages which form between the reaction of (1) and (2) will not cleave the polymeric chain.

Besides polymeric products, the invention also contemplates the use of the preferred polymeric products in cationic electrodeposition.

PERTINENT PRIOR ART

U.S. Pat. No. 3,663,389 to Koral et al discloses resinous products suitable for use in cationic electrodeposition comprising the reaction product of a polyepoxide with a polyamine such as tetraethylene pentamine. The resulting product patent solubilized with acid to provide cationic groups in the resin. The teachings of this patent differ from the present invention in that, first of all, the cationic groups are tertiary amine salt groups rather than the quaternary ammonium salt groups. In addition, there is no teaching in the reference of amines which are at all remotely similar to those prepared in accordance with the present invention.

The aforementioned U.S. Pat. No. 3,839,252 to Bosso and Wismer discloses quaternary ammonium salt group-containing resins formed from reacting polyepoxides with tertiary amine salts. Although most of the tertiary amine salts are monofunctional, the ptent does disclose amines having the following structural formula:

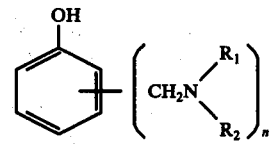

where R is an alkyl radical and $n$ is 1 to 3. Specifically disclosed is the salt of tris(dimethylaminoethyl)phenol. Such polyamines differ from those of the present claims in that they do not include a polyamine formed from reacting an organic polyisocyanate or an organic polycarboxylic acid with an active hydrogen-containing tertiary amine. As mentioned above, preparing the polyamines in this fashion gives a wide variety of amines which can be made. Reactants can be varied from a wide choice of readily available materials to provide products with a wide range of desirable properties.

U.S. Pat. No. 3,947,339 to Jerabek et al discloses cationic resins suitable for use in electrodeposition obtained from reacting polyepoxides with polyamines containing at least one secondary amine group and a primary amine group blocked by ketimine groups. The resultant resins are solubilized with acid to provide tertiary amine salt groups. An example of a suitable secondary amine which can be used is the diketimine of triethylene tetramine which, in addition to the blocked primary amine groups, contains two secondary amine groups. However, the products of this particular reference differ from those of the present invention in that they require tertiary amine salt groups for solubility rather than the quaternary ammonium salt groups of the present invention. In addition, there is no teaching in this patent of forming the polyamines in any manner analogous to that of the present invention.

DETAILED DESCRIPTION

The polyepoxides of the present invention are polymeric compounds having a 1,2-epoxy equivalency greater than 1.0, that is, the average number of 1,2-epoxy groups per molecule is greater than 1. The polyepoxide can be any of the well-known epoxides. Examples of these epoxides have been described in U.S. Pat. Nos. 2,467,171; 2,615,007; 1,716,123; 3,030,336; 3,053,855; and 3,075,999. Preferred class of polyepoxides are polyglycidyl ethers of polyphenols such as Bisphenol A. These may be prepared, for example, by etherification of a polyphenol with epichlorohydrin or dichlorohydrin in the presence of an alkali. The phenolic compound may be bis(4-hydroxyphenyl)2,2-propane; 4,4'-dihydroxybenzophenone; bis(4-hydroxyphenyl)1,1-ethane; bis(4-hydroxyphenyl)-1,1-isobutane; bis(4-hydroxy-tertiarybutyl-phenyl)2,2-propane; bis(2-hydroxynaphthyl)methane; 1,5-hydroxy-mapthalene or the like. Another useful class of polyepoxides are produced similarly from novolak resins or similar polyphenol resins.

Also suitable are similar polyglycidyl esters of polyhydric alcohols which may be derived from such polyhydric alcohols as ethylene glycol, diethylene glycol, triethlene glycol, 1,2-propylene glycol, 1,4-butylene glycol, 1,5-pentanediol, 1,2,6-hexanetriol, glycerol, bis(4-hydroxy-cyclohexyl)2,2-propane, and the like.

There can also be employed polyglycidyl ethers of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthalene dicarboxylic acid, dimerized linoleic acid and the like. Examples are diglycidyl adipate and diglycidyl phthalate.

The organic polyepoxide as described above is reacted with a polyamine containing at least two tertiary amine groups. The polyamine in turn is formed from reacting an organic polyisocyanate, which is preferred, or an organic polycarboxylic acid, anhydride or ester and an active hydrogen-containing tertiary amine.

The organic polyisocyanate (including blocked isocyanates) which can be used in the instant invention can be an aliphatic or an aromatic polyisocyanate or mixture of the two. Organic diisocyanates are preferred although higher polyisocyanates can be used in combination with the diisocyanates and/or monoisocyanates. Where higher functional polyisocyanates are used, some monofunctional isocyanates should be present to reduce the average functionality and control the tendency of the resultant reaction product to gel. Examples of suitable higher polyisocyanates are 1,2,4-benzene triisocyanate and polymethylene poly(phenyl isocyanate). Examples of suitable monoisocyanates are cyclohexyl isocyanate, phenyl isocyanate and toluene isocyanate. Examples of suitable aromatic diisocyanates are 4,4'-diphenylmethane diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed and examples include 1,4-cyclohexyl diisocyanate, isophorone diisocyanate and 4,4'-methylene-bis(cyclohexyl isocyanate).

Besides polyisocyanate compounds such as described above, NCO-containing oligomers and polymers (prepolymers) prepared from reacting organic polyisocyanates such as described above with active hydrogen-containing materials can also be employed. The activity of the hydrogen is determined according to the Zerewitinoff Test as described by Kohler in the *Journal of the American Chemical Society*, 49 3181 (1927).

Examples of suitable active hydrogen-containing compounds are polyamines, polymercapto-terminated derivatives, polyols and active hydrogen-containing compounds containing mixed substituents such as amino alcohols. Polyamines, polyols and amino alcohols are preferred because of the ease of reaction they exhibit with polyisocyanates. Polyols, polyamines and amino alcohols give no side reactions, give higher yields of urethane and urea product with no by-products. Also, with regard to polyols, there are a wide variety of materials which are commercially available.

The polyols can be either high or low molecular weight materials and can include diols, triols and higher alcohols. Although, for water-dispersible, non-gelled products, diols are preferred. If higher alcohols are used, they should be used in combination with diols and preferably monoalcohols.

In the practice of the present invention, higher molecular weight or polymeric polyols are preferred. These materials, when reacted with suitable polyisocyanates, form NCO-prepolymers which contribute extremely desirable electrocoating properties to the resultant resin. Such polymeric polyols should be predominantly linear, that is, the absence of trifunctional or higher functionality ingredients to avoid gelling of the resultant polymeric product. Preferably, the polyols should have a hydroxyl value of 200 or less, preferably within the range of 150-30. The most suitable polymeric polyols include polyalkylene ether polyols including thioethers, polyester polyols including polyhydroxy ester amides and hydroxyl-containing polycaprolactones.

Use of polyisocyanates and particularly NCO-prepolymers is preferred because they form hydrolytically stable linkages on reaction with active hydrogen-containing compounds. Also, the reaction product of an organic polyisocyanate, particularly an NCO-prepolymer, contributes very desirable physical and chemical properties to the resultant coating. For example, selection of the right NCO-prepolymer can result in electrodepositable compositions which have higher rupture voltages and throwpower and which have improved film forming properties.

Besides organic polyisocyanates, polycarboxylic acids can also be used in the practice of the invention. The acid could be aliphatic, aromatic or mixtures of the two and can be saturated or unsaturated aliphatic or of a mixed type. Organic dicarboxylic acids are preferred, although higher polycarboxylic acids can be used in combination with organic dicarboxylic acids and/or organic monocarboxylic acids, for example, fatty acids such as linoleic acid and linolenic acid. Examples of suitable higher polycarboxylic acids are: trimellitic acid and tricarballylic acid. Examples of suitable saturated aliphatic dicarboxylic acids are those having from about 2 to 18 carbon atoms per molecule and include adipic acid, azelaic acid, sebacic acid, succinic acid, glutaric acid and the like. Examples of suitable unsaturated aliphatic dicarboxylic acids include maleic acid, fumaric acid, aconitic acid, mesaconic acid, citraconic acid and itaconic acid. Examples of suitable aromatic dicarboxylic acids are phthalic acid, isophthalic acid, and terephthalic acid.

Besides the carboxylic acids such as those mentioned above, corresponding esters, partial esters and anhydrides where formable can also be used in place of part or all the acids.

The active hydrogen-containing tertiary amine which is reacted with the organic polyisocyanate or polycarboxylic acid as described above is depicted by the following structural formula:

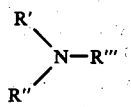

where R' and R" may be the same or different and are aliphatic radicals containing up to 6 carbon atoms. Preferably, R' and R" are alkyl radicals. R''' is an aliphatic radical containing at least one active hydrogen and an aliphatic group containing up to 6 carbon atoms. By the term "active hydrogen" is meant hydrogens attached to nitrogen, sulfur and oxygen and include primary and secondary amino hydrogen, mercapto hydrogen and hydroxyl hydrogen, with hydroxyl and amino hydrogen being preferred.

Examples of active hydrogen-containing tertiary amines are alkanolamines such as dimethylethanolamine, methyldiethanolamine, dimethylamino-2-propanol and di-n-propanolamine; thiolamines such as N,N-dimethyl-2-aminoethanethiol and N,N'-dimethyl-3-aminopropanethiol; tertiary amines such as dimethylaminopropylamine, diethylaminopropylamine and dimethylaminoethylamine.

Preferably, the active hydrogen-containing tertiary amine and the organic polyisocyanate or organic polycarboxylic acid are reacted with one another to form a product which is relatively stable in water, that is, when the final polymeric product is dispersed in water, the linkages which form between the reaction of the active hydrogen-containing tertiary amine and the organic polyisocyanate or organic polycarboxylic acid will not immediately break apart and cleave the polymeric chain.

The polyamine prepared as described above can be acidified to form the corresponding tertiary amine salt. A wide variety of acids can be used including inorganic acids such as boric acid, carbonic acid, hydrochloric acid, phosphoric acid; also, organic acids such as lactic acid, which is preferred, acetic acid, formic acid, propionic acid and butyric acid can be used.

The tertiary amine salt is then reacted with the organic polyepoxide under conditions to form a quaternary ammonium salt group-containing polymer in which the salt groups are located along and towards the middle portion of the polymer backbone. This is accomplished by the polyamine salt chain extending and increasing the molecular weight of the polyepoxides. It is through this chain extension that the ionic charges are positioned in the middle portions of the polymer backbone. In the reaction of the polyamine with the polyepoxide, reaction occurs with the oxirane ring to ring open the product forming a quaternary ammonium salt group and a hydroxyl group.

Besides forming the tertiary amine salt of the polyamine, and subsequently reacting the salt with the polyepoxide, the polyamine can be reacted with the polyepoxide first, in the presence of water, and the reaction product subsequently acidified.

The equivalent ratio of polyepoxide to polyamine will vary depending on the molecular weight of the product desired and the reactivity of the polyamine and the polyepoxide. For electrodeposition use, the equivalent ratios should be controlled so as to produce polymeric products which contain about 0.2 to about 0.9 and preferably from about 0.4 to about 0.6 milliequivalents of quaternary nitrogen per gram of resin. Lower than the recommended amount of milliequivalents per gram results in poor resin solubility and unacceptable film builds upon electrodeposition. Higher than the recommended amounts of milliequivalents per gram results in a resin which is too water-soluble for electrodeposition purposes.

Also, for electrodeposition use, the polymer should be water-dispersible and non-gelled and, of course, electrodepositable on the cathode. Essentially linear polymers are preferred. Therefore, both the polyepoxide and the polyamine are preferably difunctional.

The amine (or amine salt) and the polyepoxide are reacted by mixing the components, preferably in the presence of a controlled amount of water. The amount of water employed should be that amount which allows for smooth reaction of the amine with the epoxy groups but not sufficient to cause extremely slow reaction. Typically, water is employed on the basis of about 1.75 to about 20 percent by weight, based on total reaction mixture solids, preferably from about 2 percent to about 15 percent by weight based on total reaction solids.

The reaction temperature may be varied between the lowest temperature at which reaction proceeds reasonably, for example, at room temperature, to a maximum temperature of about 100° C. and 110° C.

A solvent is not necessary although one may be used to afford better control of the reaction. Aromatic hydrocarbons or glycol ethers are suitable solvents.

Aqueous compositions containing the resinous products of the invention are highly useful as coating compositions and can be applied by many conventional methods, such as dipping, brushing, etc. The aqueous compositions are, however, eminently suited for application by cationic electrodeposition.

For electrodeposition, the above-described resinous products are dispersed in water to about 1 to 30 percent by weight resin solids. The term "aqueous dispersion" as used within the context of the present invention is intended to cover 2-phase translucent, aqueous-resin systems, particularly those in which the aqueous phase forms the continuous phase and is also intended to cover homogenous aqueous solutions which appear optically clear. The aqueous dispersions of the present invention have dispersed phases which have average particle size diameters of about 0.1 to 5 microns. The dispersed phase may be spherical or elongated in shape or actually invisible by microscopic investigation.

The products can be employed as such to electrodeposit clear films, but ordinarily they are used as a vehicle along with a pigment composition. The pigment composition used may be any conventional type, for example, iron oxides, lead oxides, strontium chromate, carbon black, titanium dioxide, talc, barium sulfate and the like, as well as combinations of these and similar pigments. Color pigments such as cadmium yellow, cadmium red, phthalocyanine blue, chromic yellow, toluidine red, hydrated iron oxide, and the like may also be included.

Dispersing or surface active agents are usually used with the pigments and should be of the non-ionic or cationic type or a combination of these types. The pigment and surface active agent are ground together in a portion of the vehicle to make a paste, and this is blended with a major portion of the vehicle to produce a coating composition. There may also be included in the coating compositions additives such as anti-oxidants, wetting agents, dryers, anti-foaming agents, suspending agents, and the like. It is often desirable to include small amounts of water-miscible organic solvents, which may be added to the resinous vehicle to aid in handling and processing. Examples of such solvents are glycol ethers.

It has been found in most instances that desirable coatings are obtained using pigmented compositions containing weight ratios of pigment to vehicle of about 1.5 to 1 or less and preferably less than about 1 to 1. If the composition has too high a pigment to vehicle ratio, the electrodeposited film may have poor flow characteristics.

Coating compositions of the present invention may optionally include a crosslinker or curing agent to give harder, more corrosion-resistant coatings. The preferred curing agents are capped isocyanate derivatives. As has been mentioned above, when the tertiary amine salt reacts with the epoxy moiety, a quaternary ammonium salt group and a hydroxyl group is formed. It is through this hydroxyl group that the isocyanate groups react to crosslink and cure the coating. The isocyanates should be blocked or capped so they will not react with the hydroxyl in the coating composition until the coated article is heated to a high enough temperature to unblock the blocked isocyanates and cure the coating.

Polyisocyanate curing agents can be used in two similar ways. The polyisocyanate can be fully capped, that is, no free isocyanate groups remain, and then added to the chain-extended quaternary ammonium salt group-containing polymer to form a two-component system. Alternately, the polyisocyanate can be partially capped, for example, half-capped diisocyanate so that one reactive isocyanate group remains. The partially capped isocyanate can then be reacted with the polyepoxide through the hydroxyl groups present under conditions which will not unblock the isocyanate. This reaction makes the capped isocyanate a part of the polymer molecule and a one-component system. When the resultant coated article is heated to a high temperature, the blocked isocyanate group will unblock to react with the unreacted hydroxyls and other polyepoxide molecules and cure the resultant coating.

In formulating the water-dispersed compositions, ordinary tap water may be employed. However, such water may contain relatively high levels of ions which, while not ordinarily rendering the process inoperative, may result in variations in the properties of the baths when used for electrodeposition. In such cases, it is often desirable to utilize deionized water from which the free ions have been removed, such as by passage through an ion exchange resin.

In the electrodeposition process employing the aqueous coating compositions described above, the aqueous composition is placed in contact with an electrically conductive anode and an electrically conductive cathode with the surface to be coated being the cathode. Upon passage of electric current between the anode and the cathode, while in contact with a bath containing the coating composition, an adherent film of the coating composition is deposited on the cathode.

The conditions under which electrodeposition is carried out are, in general, similar to those used in electrodeposition of other types of coatings. The applied voltage may be varied greatly and can be, for example, as low as 1 volt or as high as several thousand volts, although typically between 50 volts and 500 volts are employed. The current density is usually between about 1.0 ampere and 15 amperes per square foot and tends to decrease during electrodeposition. The method of the invention is applicable to the coating of any electrically conductive substrate and especially metal such as steel, aluminum, copper and the like.

After deposition, the coating is usually baked at elevated temperatures by any convenient method such as in ovens or with banks of infrared heat lamps.

The invention will be described further in conjunction with several examples showing the method and practice of the invention. These examples, however, are not to be construed as limiting the invention to their details. All parts and percentages by weight are based upon non-volatile contents unless otherwise indicated.

EXAMPLE A

A polyamine containing two tertiary amine groups formed from reacting toluene diisocyanate, a polycaprolactone diol and dimethylethanolamine was formed from the following charge:

| Ingredient | Parts by Weight |
|---|---|
| toluene diisocyanate (80/20 isomeric mixture) | 174 |
| polycaprolactone diol (MW=540)[1] | 265 |
| dimethylethanolamine | 89 |

[1]Sold commercially by Union Carbide Corporation under the trade name PCP 0200 and believed to be epsilon-caprolactone ring opened with diethylene glycol.

The procedure for making the polyamine was to first make an NCO-prepolymer by reacting toluene diisocyanate with polycaprolactone diol and then capping the NCO-prepolymer with a dimethylethanolamine.

The polycaprolactone diol was charged to a reaction vessel containing the toluene diisocyanate. The temperature was held at 30°–35° C. for 1 hour followed by the addition of the dimethylethanolamine. The reaction mixture was permitted to exotherm for ½ hour and then cooled to room temperature.

EXAMPLE B

A polyamine containing two tertiary amine groups formed from reacting toluene diisocyanate, polypropylene glycol and dimethylethanolamine was formed from the following charge:

| Ingredient | Parts by Weight |
|---|---|
| toluene diisocyanate (80/20 isomeric mixture) | 174 |
| polypropylene glycol (MW=625)[1] | 302 |
| dimethylethanolamine | 89.1 |

[1]Sold commercially by Union Carbide Corporation under the trade name PPG 625.

The procedure for making the polyamine was similar to that in Example A, that is, an NCO-prepolymer was first prepared by reacting the toluene diisocyanate with the polypropylene glycol and then capping the NCO-prepolymer with the dimethylethanolamine. The polypropylene glycol was charged to a reaction vessel containing the toluene diisocyanate. The temperature was held at 30° to 35° C. for about 1 hour, followed by the addition of the dimethylethanolamine. The mixture was permitted to exotherm for ½ hour and then cooled to room temperature.

EXAMPLE I

A non-gelled, internally ionized quaternary ammonium salt group-containing polymer which is suitable for use as a coating vehicle in cationic electrodeposition was prepared from the following charge:

| Ingredient | Parts by Weight | Solids |
|---|---|---|
| EPON 829[1] | 461.22 | 442.54 |
| Bisphenol A | 148.89 | 148.89 |
| 2-ethylhexyl half-capped toluene diisocyanate | 331.4 | 314.87 |
| polyamine of Example A | 297.55 | 297.55 |
| lactic acid (75 percent by weight aqueous solution) | 66 | 49.5 |
| phenyl CELLOSOLVE[2] | 112.8 | — |
| FOAM KILL 639[3] | 6.3 | — |
| TEXANOL[4] | 112.8 | — |
| deionized water | 62.67 | — |

[1]Epoxy resin solution made from reacting epichlorohydrin and Bisphenol A, having an epoxy equivalent of approximately 193-203, commercially available from Shell Chemical Company.
[2]Phenyl CELLOSOLVE is ethylene glycol monophenyl ether.
[3]FOAM KILL 639 is a hydrocarbon oil-containing diatomaceous earth surfactant.
[4]TEXANOL is 2,2,4-trimethylpentanediol-1,3-monoisobutyrate.

The polymer was prepared by charging the EPON 829 and Bisphenol A to a suitable reaction vessel, heating to 160°-165° C. and permitting the reaction mixture to exotherm. The reaction was maintained at a temperature of 155°-160° C. for 1 hour and then cooled to 120° C., followed by the addition of the 2-ethylhexanol half-capped toluene diisocyanate. The reaction mixture was held for 1 hour at 120° C., followed by the addition of the phenyl CELLOSOLVE, FOAM KILL 639, and 62.8 parts by weight of the TEXANOL. The remainder of the TEXANOL was pre-mixed with the lactic acid solution, deionized water and the polyamine of Example A to form a reactive mixture for quaternizing the polymeric product previously prepared. This reactive quaternizing mixture was added to the reaction mixture over a 30-minute period to form a 78.35 percent solids dispersion of non-gelled, quaternary ammonium salt group-containing polymer in which the salt groups are located along and towards the middle portion of the polymer backbone. The polymer contained 0.4388 milliequivalents of quaternary ammonium salt groups per gram of polymer.

When tested for throwpower in a General Motors cell (10 percent solids bath, 14 inch immersion depth), the polymer showed a throwpower of 7 inches when electrodeposited at 200 volts for 2 minutes at a temperature of 25° C.

EXAMPLE II

A non-gelled, internally ionized quaternary ammonium salt group-containing polymer suitable for use as a coating vehicle in cationic electrodeposition was prepared from the following charge:

| Ingredient | Parts by Weight | Solids |
|---|---|---|
| EPON 829 | 461.22 | 442.54 |
| Bisphenol A | 148.89 | 148.89 |
| 2-ethylhexyl half-capped toluene diisocyanate | 331.44 | 314.87 |
| polyamine of Example B | 354.75 | 319.28 |
| lactic acid (75 percent by weight aqueous solution) | 66 | 49.5 |
| phenyl CELLOSOLVE | 114.76 | — |
| FOAM KILL 639 | 6.3 | — |
| TEXANOL | 114.76 | — |
| deionized water | 63.75 | — |

The polymer was prepared by charging the EPON 829 and Bisphenol A to a suitable reaction vessel, heating to 160°-165° C. and permitting the reaction mixture to exotherm. The reaction was maintained at 155°-160° C. for 1 hour and then cooled to 120° C., followed by the addition of the 2-ethylhexanol half-capped toluene diisocyanate. The reaction mixture was held for 1 hour at 120° C., followed by the addition of the phenyl CELLOSOLVE, FOAM KILL 639 and 62.8 parts by weight of the TEXANOL. The remainder of the TEXANOL was pre-mixed with the lactic acid solution, deionized water and the polyamine of Example B to form a reactive mixture for quaternizing the polymeric product previously prepared. This reactive quaternizing mixture was added over a 30-minute period to the reaction mixture to form a 76.73 percent solids dispersion of quaternary ammonium salt group-containing polymer in which the salt groups are located along and towards the middle portion of the polymer backbone. The polymer contained 0.4313 milliequivalents of quaternary ammonium salt groups per gram of polymer.

When tested for throwpower in a General Motors cell (10 percent solids bath, 14 inches immersion depth), the polymer showed a throwpower of 7 inches when electrodeposited at 200 volts for 2 minutes at a bath temperature of 25° C.

EXAMPLE III

A polyamine containing two tertiary amine groups was formed from reacting an organic polycarboxylic acid ester (dimethylazelate) with an active hydrogen-containing tertiary amine (dimethylaminepropylamine) in the following charge ratio:

| Charge | Parts by Weight |
|---|---|
| dimethylazelate | 216 |
| dimethylaminepropylamine | 408 |

The reactants were charged to a reaction vessel and heated to reflux for about 2 days. The reaction mixture was cooled to 25° C. to form a solid. Cyclohexane was added to the reaction vessel to slurry the reaction product followed by filtering and reslurrying the retentate and filtering again. The retained reaction product was then dried, and was believed to have the following structure:

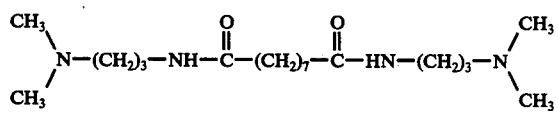

The polyamine containing the two tertiary amine groups was then reacted with an organic polyepoxide to form an internally ionized quaternary ammonium salt group-containing polymer in the following charge ratio:

| Ingredient | Parts by Weight |
| --- | --- |
| EPON 1004[1] | 1000 |
| diamine prepared as described above | 151.3 |
| 75 percent by weight aqueous lactic acid solution | 100.8 |
| phenyl CELLOSOLVE | 245.4 |
| deionized water | 49 |

[1] Epoxy resin prepared from reacting epichlorohydrin and Bisphenol A having an epoxy equivalent of approximately 875–1000 commercially available from Shell Chemical Company.

The EPON 1004 was charged to a reaction vessel and melted under a nitrogen blanket. Forty parts of the phenyl CELLOSOLVE was added followed by the addition of the diamine, lactic acid solution, remaining phenyl CELLOSOLVE and deionized water. One hundred parts by weight of methyl ethyl ketone was added to thin the reaction mixture. The reaction mixture was held at 85°–95° C. for 1 hour. Nine hundred eighty-five parts by weight of the reaction mixture was poured into a can and then thinned with 15 parts by weight of warm deionized water. An additional 100 parts by weight of butyl CELLOSOLVE (monobutyl ether of ethylene glycol) was added.

An electrodeposition bath was formed by further thinning the reaction-mixture with 1100 parts by weight of deionized water. The bath was filtered and cooled. When tested for throwpower in a GM cell (22 percent solids bath, 17 inches immersion depth), the polymer showed a throwpower of 8 inches when electrodeposited at 400 volts for 2 minutes at a bath temperature of 27° C.

I claim:

1. An internally ionized, quaternary ammonium salt group-containing polymer, comprising the reaction product of:
   A. an organic polyepoxide,
   B. a polyamine containing at least two tertiary amine groups, formed from reacting:
      1. a member selected from the class consisting of an organic polyisocyanate, an organic polycarboxylic acid, ester or anhydride, and mixtures thereof,
      2. an active hydrogen-containing tertiary amine in which the active hydrogen is selected from the class consisting of hydroxyl, mercapto, primary and secondary amino;
   said reaction product being acidified so as to provide a quaternary ammonium salt group-containing polymer in which the salt groups are located along the polymer backbone.

2. A reaction product of:
   A. an organic polyepoxide,
   B. a polyamine containing at least two tertiary amine groups, formed from reacting:
      1. a member selected from the class consisting of an organic polyisocyanate, an organic polycarboxylic acid, ester or anhydride and mixtures thereof,
      2. an active hydrogen-containing tertiary amine in which the active hydrogen is selected from the class consisting of hydroxyl, mercapto, primary and secondary amino.

3. The product of claim 1 in which the organic polyepoxide is a polyglycidyl ether of a polyphenol.

4. The product of claim 2 in which the organic polyisocyanate is an NCO-containing polymer.

5. The product of claim 1 in which the active hydrogen-containing tertiary amine is a hydroxyl-containing tertiary amine.

6. An aqueous dispersion of a non-gelled, internally ionized, quaternary ammonium salt group-containing polymer electrodepositable on the cathode, comprising a reaction product of:
   A. an organic polyepoxide,
   B. a polyamine containing at least two tertiary amine salt groups formed from reacting:
      1. a member selected from the class consisting of an organic polyisocyanate, an organic polycarboxylic acid, ester or anhydride, and mixtures thereof,
      2. an active hydrogen-containing tertiary amine in which the active hydrogen is selected from the class consisting of hydroxyl, mercapto, primary and secondary amino,
      (1) and (2) reacting with one another to form a polyamine which is relatively stable in water;
   said reaction product being acidified to provide a quaternary ammonium salt group-containing polymer in which the salt groups are located along the polymer backbone.

* * * * *

UNITED STATES PATENT AND TRADEMARK OFFICE
CERTIFICATE OF CORRECTION

PATENT NO. : 4,069,210

DATED : January 17, 1978

INVENTOR(S) : Karl F. Schimmel

It is certified that error appears in the above–identified patent and that said Letters Patent are hereby corrected as shown below:

Cover page, third name listed under "References Cited", "Sekinakas" should be --Sekmakas--.

Column 2, line 23, "patent" should be --is--.

Column 2, line 35, "ptent" should be --patent--.

Column 3, line 14, "1,716,123" should be --2,716,123--.

Column 3, line 24, "mapthalene" should be --naphthalene--.

Column 6, line 54, "homogenous" should be --homogeneous--.

Signed and Sealed this

Sixth Day of June 1978

[SEAL]

Attest:

RUTH C. MASON
*Attesting Officer*

DONALD W. BANNER
*Commissioner of Patents and Trademarks*